United States Patent
Takada et al.

(10) Patent No.: US 6,848,923 B2
(45) Date of Patent: Feb. 1, 2005

(54) SWITCH STRUCTURE OF CARD CONNECTOR

(75) Inventors: Toshihumi Takada, Tokyo (JP); Toshiyasu Ito, Togane (JP)

(73) Assignee: Yamaichi Electronics Co., Ltd., Tokyo (JP)

(*) Notice: Subject to any disclaimer, the term of this patent is extended or adjusted under 35 U.S.C. 154(b) by 0 days.

(21) Appl. No.: 10/389,921

(22) Filed: Mar. 18, 2003

(65) Prior Publication Data

US 2003/0216074 A1 Nov. 20, 2003

Related U.S. Application Data

(63) Continuation of application No. 09/869,756, filed on Oct. 15, 2001, now Pat. No. 6,638,087.

(30) Foreign Application Priority Data

Nov. 5, 1999 (JP) ............................................. 11-316088
Nov. 2, 2000 (WO) ................................. PCT/JP00/07760

(51) Int. Cl.⁷ ............................................. H01R 29/00
(52) U.S. Cl. ....................................................... 439/188
(58) Field of Search ............................... 439/188, 489, 439/630, 633; 235/441, 482; 200/51.09, 61.59, 47

(56) References Cited

U.S. PATENT DOCUMENTS

| 3,283,107 A | 11/1966 | Anson |
| 3,988,779 A | 10/1976 | Leis et al. |
| 3,997,916 A | 12/1976 | Staar |

(List continued on next page.)

FOREIGN PATENT DOCUMENTS

| EP | 0 284 431 A2 | 9/1988 |
| EP | 0 669 590 A2 | 8/1995 |
| EP | 0 908 981 A2 | 4/1999 |
| EP | 0947944 A2 | 10/1999 |
| JP | 5-96941 | 12/1993 |
| JP | 06-340193 A2 | 12/1994 |
| JP | 08-166906 A | 6/1996 |
| JP | 10-144418 A2 | 5/1998 |
| JP | 10-144422 | 5/1998 |
| JP | 10-177875 A2 | 6/1998 |
| JP | 10-187896 | 7/1998 |
| JP | 10-255012 | 9/1998 |
| JP | 10-255910 A | 9/1998 |
| JP | 10-302030 A2 | 11/1998 |
| JP | 11-097110 A2 | 4/1999 |
| JP | 11-149956 | 6/1999 |
| WO | WO 98/33138 | 7/1998 |
| WO | WO 01/35331 | 5/2001 |

OTHER PUBLICATIONS

Office Action dated Feb. 26, 2004, from Japanese Patent Office for Japanese Patent Application No. 11-316107.
EPO Search Report dated Feb. 24, 2004, for European Patent Application No. 00971780.2.
U.S. Appl. No. 09/889,007, filed Oct. 29, 2001, Abe.
U.S. Appl. No. 09/890,950, filed Nov. 9, 2001, Shishikura et al.
International Search Report Application No. PCT/JP00/07760 dated Jan. 26, 2001.
International Search Report Application No. PCT/JP00/07761 dated Jan. 26, 2001.

Primary Examiner—Ross Gushi
Assistant Examiner—Phuongchi Nguyen
(74) Attorney, Agent, or Firm—Finnegan, Henderson, Farabow, Garrett & Dunner, LLP (57) ABSTRACT

The write protect detection switch SW1 to detect the slide position of the write protect button 3 is arranged on the side wall portion of the connector housing and the card recognition switch SW2 to detect the presence or absence of the inserted card 1 is arranged inside the card abutment wall of the connector housing. This construction allows the write protect detection switch and the card recognition switch to be accommodated efficiently in a small space.

2 Claims, 9 Drawing Sheets

U.S. PATENT DOCUMENTS

| | | |
|---|---|---|
| 4,506,122 A | 3/1985 | Miyata |
| 4,511,936 A | 4/1985 | Sims, Jr. |
| 5,016,123 A | 5/1991 | Karsh |
| 5,463,210 A | 10/1995 | Imura |
| 5,718,609 A | 2/1998 | Braun et al. |
| 5,820,391 A * | 10/1998 | Delprete et al. ............... 439/91 |
| 5,911,587 A | 6/1999 | Vermeersch |
| 5,923,082 A | 7/1999 | Takemura |
| 6,004,155 A | 12/1999 | Wu |
| 6,015,311 A | 1/2000 | Benjamin et al. |
| 6,039,599 A | 3/2000 | Benjamin et al. |
| 6,059,592 A | 5/2000 | Inadama |
| 6,073,853 A | 6/2000 | Odic |
| 6,099,335 A | 8/2000 | Chang |
| 6,126,464 A | 10/2000 | Chang |
| 6,129,571 A | 10/2000 | Ikemoto |
| 6,399,906 B1 | 6/2002 | Sato et al. |
| 6,638,087 B1 * | 10/2003 | Takada et al. ............... 439/188 |
| 2001/0036770 A1 | 11/2001 | Saito et al. |

* cited by examiner

SWITCH STRUCTURE OF CARD CONNECTOR

This is a continuation of application Ser. No. 09/869,756, filed Oct. 15, 2001, now U.S. Pat. No. 6,638,087 PCT Application No. JP00/07760, filed Nov. 2, 2000, and Japanese Patent Application No. 316,088/1999 filed Nov. 5, 1999, all of which are incorporated herein by reference.

TECHNICAL FIELD

The present invention relates to a card connector for connecting an IC card to electronic devices, such as cellular phones, telephones, PDAs (personal digital assistants), portable audio devices and cameras, and more specifically to a switch structure for detecting the position of a write protect button of the IC card and the presence or absence of the IC card.

BACKGROUND ART

In electronic devices such as cellular phones, telephones, PDAs and digital cameras, a variety of functions are added by inserting an IC card with a built-in memory or control IC, such as a SIM (subscriber identity module) card, an MMC (multimedia card), a Smart Media (tradename) card and an SD (super density or secure digital) card.

In a connector structure for removably accommodating such an IC card, a plurality of contact terminals made of a metal leaf spring are provided in a connector housing to make contact with a plurality of contact pads formed on the front or back surface of the inserted IC card to electrically connect the IC card to the electronic device having that connector. The contact pads of the IC card include a power supply pad connected to a power supply line and a plurality of signal pads for transferring various signals. These contact pads are connected via the contact terminals of the card connector to a power supply circuit and various signal processing circuits in the electronic device.

The IC card of this kind normally employs some means for prohibiting the write operation in order to protect information stored in its internal memory. One such means is a write protect button that can slide between two positions, as in a floppy disk. In such a slide button system, the card is provided with a write protect button that can slide between two positions and which, when it is situated at one position, sets the card to a write disable state and, when it is slid to the other position, sets it to a write enable state. On the connector side, a detector needs to be provided that detects the slide position of the write protect button.

Further, in addition to the slide position signal of the write protect button, the electronic device often calls for a signal indicating whether the card is inserted or not. Hence, the connector should also be provided with a detector for checking the card insertion.

As a sensor structure for detecting a variety of these states, a light-based sensor structure may be considered. The light-based sensor structure, however, has drawbacks that a sufficient detection precision cannot be expected as the card becomes thinner and smaller and that the installation of a light sensor can hinder reductions in size and cost. Hence, a sensor structure utilizing the engagement and disengagement of a contact leaf spring is considered the most promising structure overall.

When these detectors are to be constructed of contact leaf springs, because each detector requires a pair of contact leaf springs, the total number of contact leaf springs required in the connector as a whole is two times the number of detectors.

Such a construction therefore has a large number of parts making up the detectors and requires a large space to accommodate these parts, which is detrimental to reducing the thickness and size of the connector structure.

Further, when the detection switch for the write protect button and the card recognition switch are to be installed inside the connector, it is difficult to arrange the two switches efficiently in a small space. Thus, a layout has been called for which allows these two switches to be arranged efficiently in as small a space as possible.

The present invention has been accomplished under these circumstances. It is an object of the invention to provide a switch structure of a card connector that can efficiently arrange in a small space the switches for detecting the write protect button and for checking the presence or absence of the card.

It is also an object of the invention to provide a switch structure of a card connector which can construct the write protect detection switch and the card recognition switch, both composed of contact leaf springs, by using a small number of parts and which can arrange these switches in a small space.

DISCLOSURE OF THE INVENTION

Viewed from one aspect, the present invention provides a switch structure of a card connector, wherein the card connector holds a card in a connector housing in such a manner that contact pads of the card engage contact terminals arranged in the connector housing, the card having a write protect button slidable in a recess formed in a card side surface, the switch structure comprising: a first switch arranged on a side wall portion of the connector housing to detect a slide position of the write protect button; and a second switch arranged in a card abutment wall of the connector housing to detect the presence or absence of the inserted card.

With this invention, a pair of the first and second switches are collectively arranged in a part of the connector housing corresponding to a front corner of the card, thus allowing the two switches to be installed efficiently in a small space and contributing to a reduction in the size of the connector structure.

Another aspect of the present invention provides a switch structure of a card connector, wherein the first switch and the second switch have: a cantilevered first contact leaf spring urged to engage its engagement portion with a part of the recess corresponding to one slide position of the write protect button of the inserted card; a second contact leaf spring urged to engage its engagement portion with a part of the recess corresponding to the other slide position of the write protect button of the inserted card, the second contact leaf spring extending along the first contact leaf spring on the inner side of the first contact leaf spring; and a third contact leaf spring urged to engage with a front face wall of the inserted card and adapted to come into contact with the second contact leaf spring when the card is inserted; wherein the first switch detects the slide position of the write protect button according to a displacement of the first and second contact leaf springs in a direction of their engagement or disengagement and the second switch detects the presence or absence of the inserted card according to a displacement of the second and third contact leaf springs in a direction of their engagement or disengagement.

In this invention, one of the contact leaf springs making up the two switches—the write protect detection switch and the card recognition switch—is shared by the two switches.

This can reduce the number of parts of the contact leaf springs and therefore the cost and space.

BEST MODE FOR CARRYING OUT THE INVENTION

Now, embodiments of this invention will be described in detail by referring to the accompanying drawings.

Figure 1:
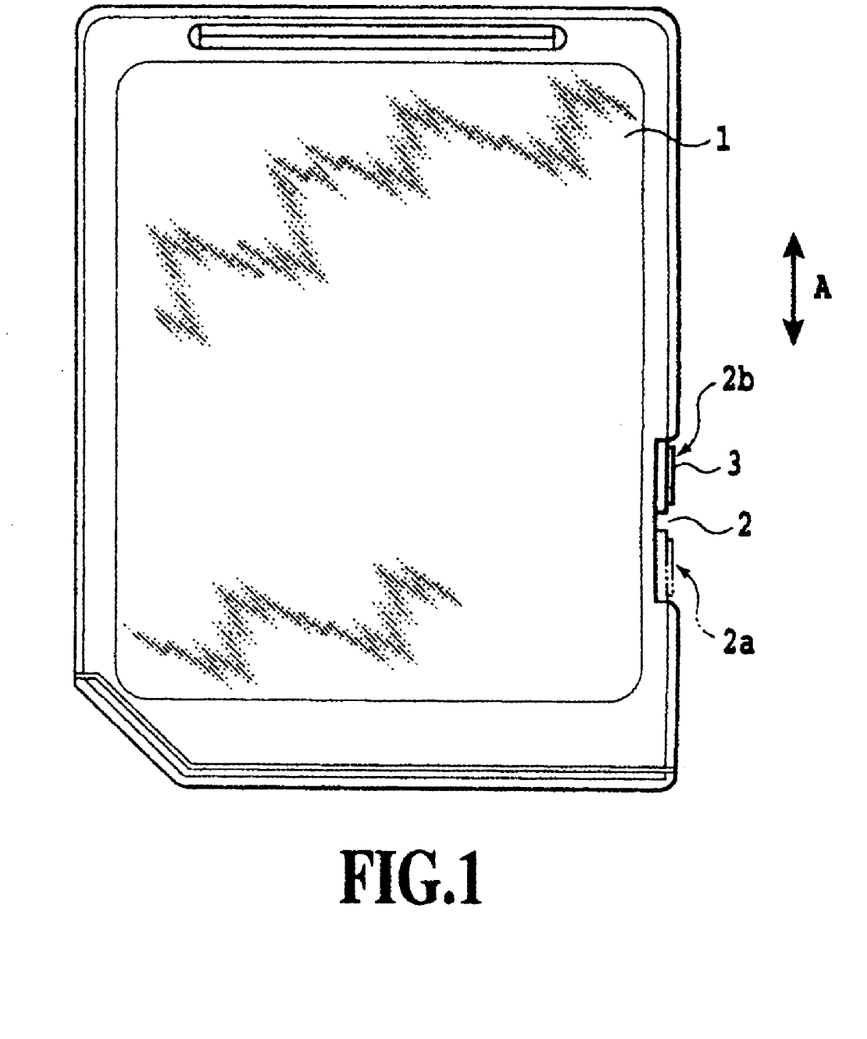
FIG. 1 is a plan view showing an example of an IC card inserted into the card connector of this invention.

FIG. 1 is a plan view of an example IC card to be loaded into the card connector of this invention.

The IC card 1 is one called an SD (super density or secure digital) card.

The IC card 1 has a recess 2 formed at one side, in which a write protect button 3 is arranged slidable in a card insertion/retraction direction (direction of arrow A). The write protect button 3 can be slid to one of two positions: a protect-off position (write enable position) indicated by a solid line and a protect-on position (write disable position) indicated by a dashed line.

That is, when the button 3 is set to a rear side portion 2b in the recess 2, the card 1 is write-enabled. When the button 3 is set to a front side portion 2a in the recess 2, the card 1 is write-disabled. Though not shown in FIG. 1, the back surface of the card 1 is formed with a plurality of contact pads designed to make contact with contact terminals on the connector side, including a power supply pad and signal pads.

Figure 2:
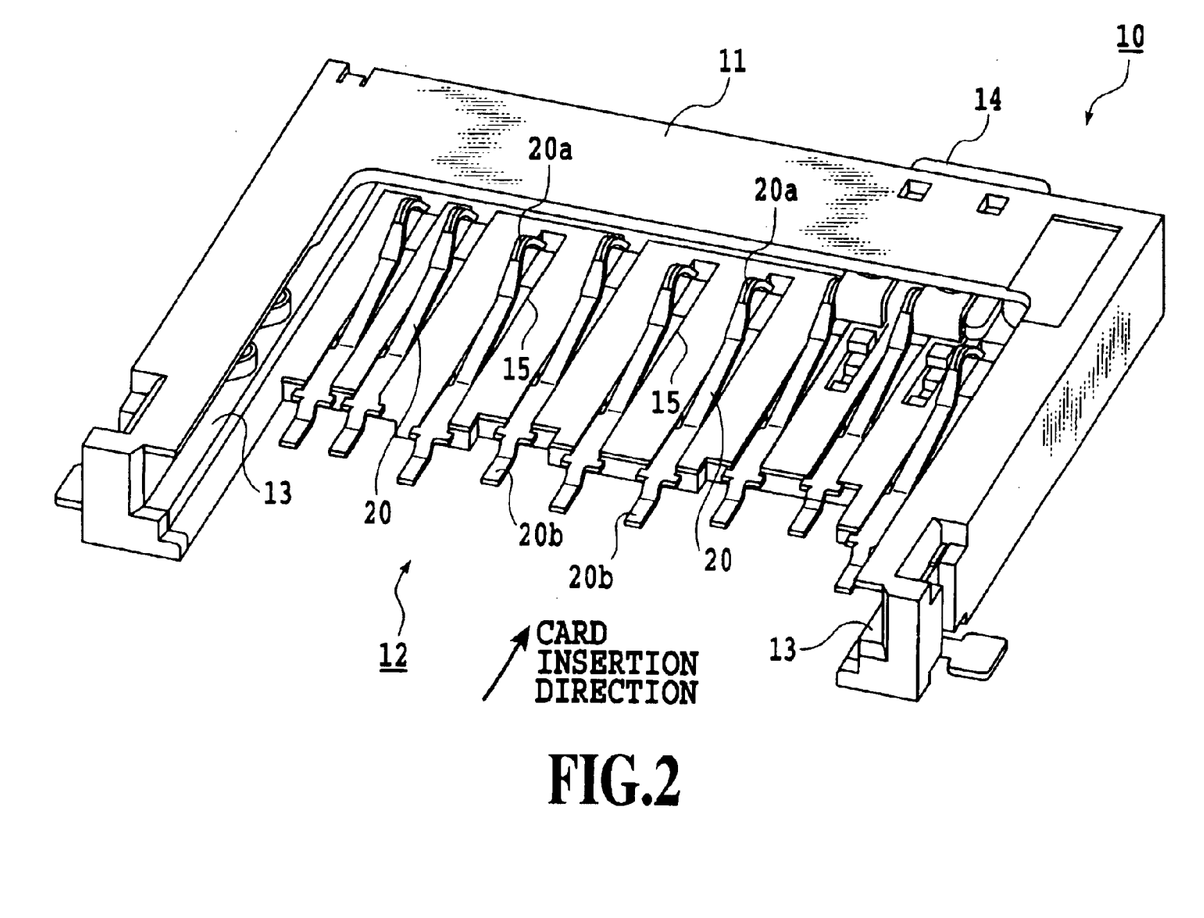
FIG. 2 is a perspective view showing an overall construction of the card connector applying this invention.
Figure 3:
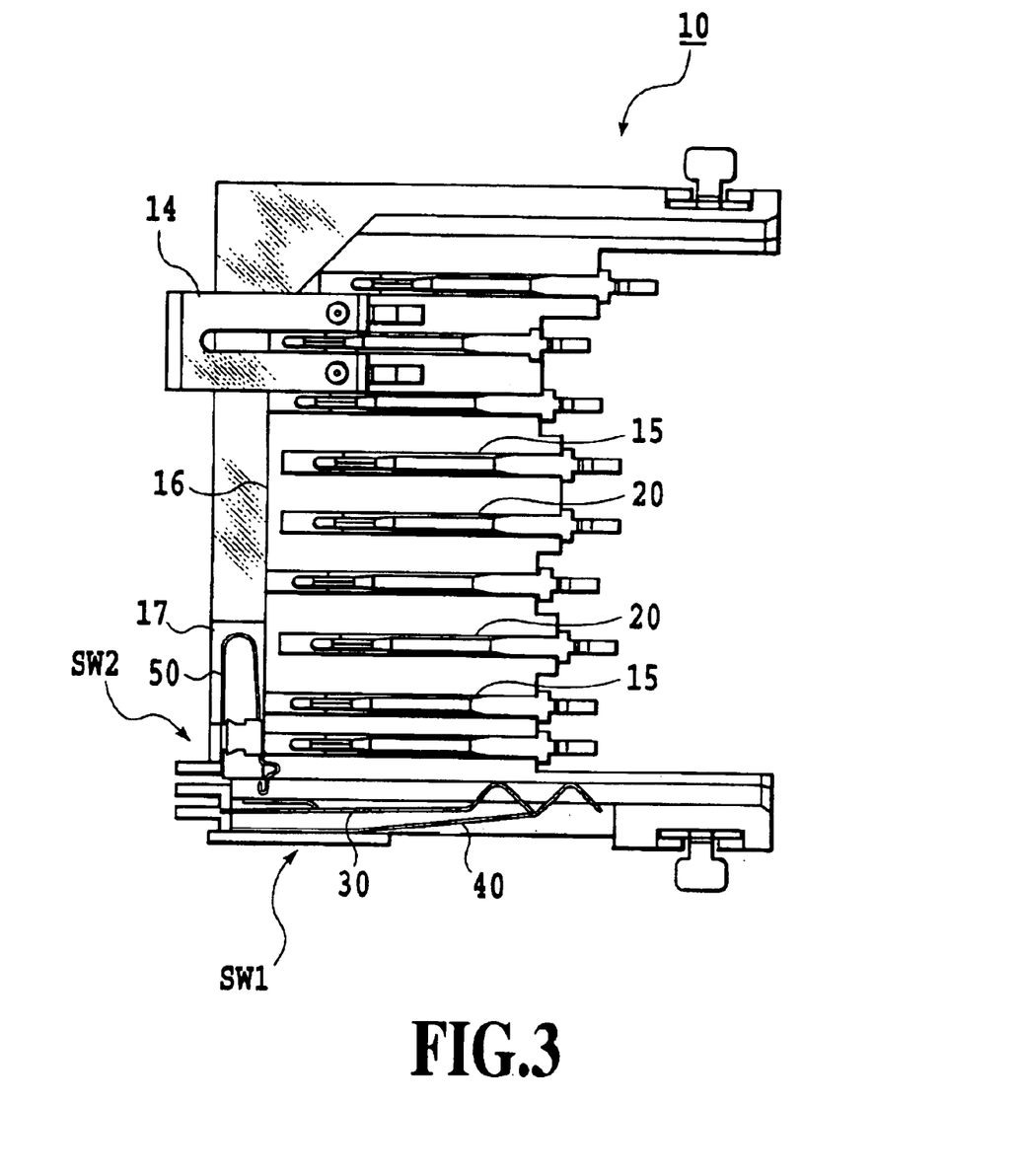
FIG. 3 is a horizontal cross section showing an inner construction of an embodiment of the card connector according to the invention when a card is not inserted.
Figure 4:
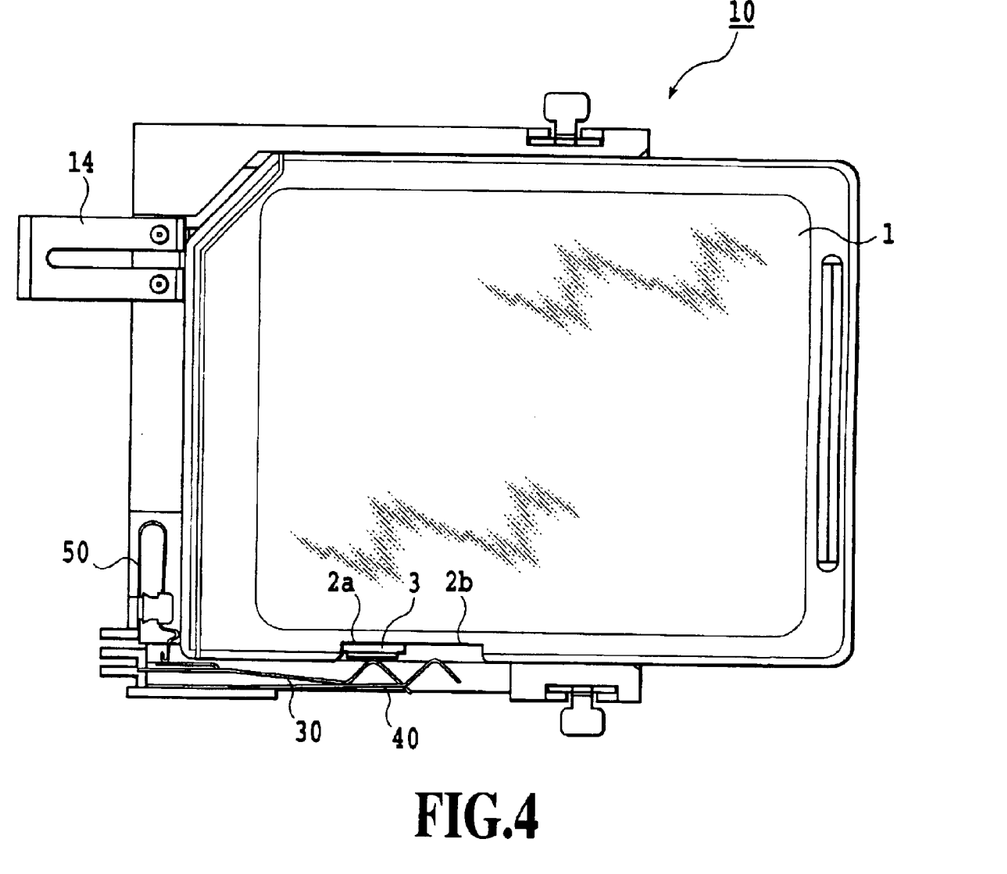
FIG. 4 is a horizontal cross section showing an inner construction of the embodiment of the card connector according to the invention when a card is inserted.

FIG. 2 shows an overall construction of the connector 10 into which the IC card 1 is to be inserted. FIG. 3 is a horizontal cross section of the connector 10 when it is not loaded with the card 1. FIG. 4 is a horizontal cross section of the connector 10 when it is loaded with the card 1.

The connector 10 is secured to an appropriate location on an electronic device, such as cellular phones, telephones, PDAs, portable audio devices and cameras.

In FIGS. 2 to 4, the housing body 11 is molded of an insulating material such as resin and has formed in its front face a card insertion opening 12 through which the card 1 is inserted. On the inner side portions of the housing body 11 are formed guide rails 13 for guiding the card 1 as it is inserted or withdrawn. An eject member 14 is arranged in the housing body 11 so that it is slidable in the card insertion/retraction direction. Sliding the eject member 14 forward as shown in FIG. 3 can eject the loaded card 1 out of the connector. This eject member 14 may be linked to an appropriate eject mechanism (not shown) which is driven in response to the operation of an eject button provided on the electronic device. This allows the card 1 to be ejected by the operation of the button.

A base plate portion of the housing body 11 is formed with a plurality of grooves 15 in which a plurality of contact terminals 20 formed from cantilevered contact leaf springs are positioned and press-fitted. The contact terminals 20 are used as a power supply terminal and signal terminals. The contact terminals 20 have their front end contact portions 20a projected in an arc to come into contact with a plurality of contact pads formed on the card 1. The contact terminals 20 have their base end portions 20b soldered to contact pads on a printed circuit card of the electronic device.

On one inner side wall portions of the housing body 11 two contact leaf springs 30 and 40 are arranged so that their front end engagement positions are staggered from each other. The engagement and disengagement between these two contact leaf springs 30 and 40 are used to detect the position of the write protect button 3 of the card 1. That is, the two contact leaf springs 30 and 40 form a write protect detection switch SW1.

A card abutment wall 16 of the housing body 11 which the front end face of the card 1 engages is formed with an accommodation space 17 in which a folded contact leaf spring 50 is securely installed.

The contact leaf spring 50 comes into contact with the contact leaf spring 30 according to whether the card 1 is inserted or not. That is, the two contact leaf springs 30 and 50 form a card recognition switch SW2.

In this way, the contact leaf spring 30 is commonly used by the write protect detection switch SW1 and the card recognition switch SW2.

Figure 5:
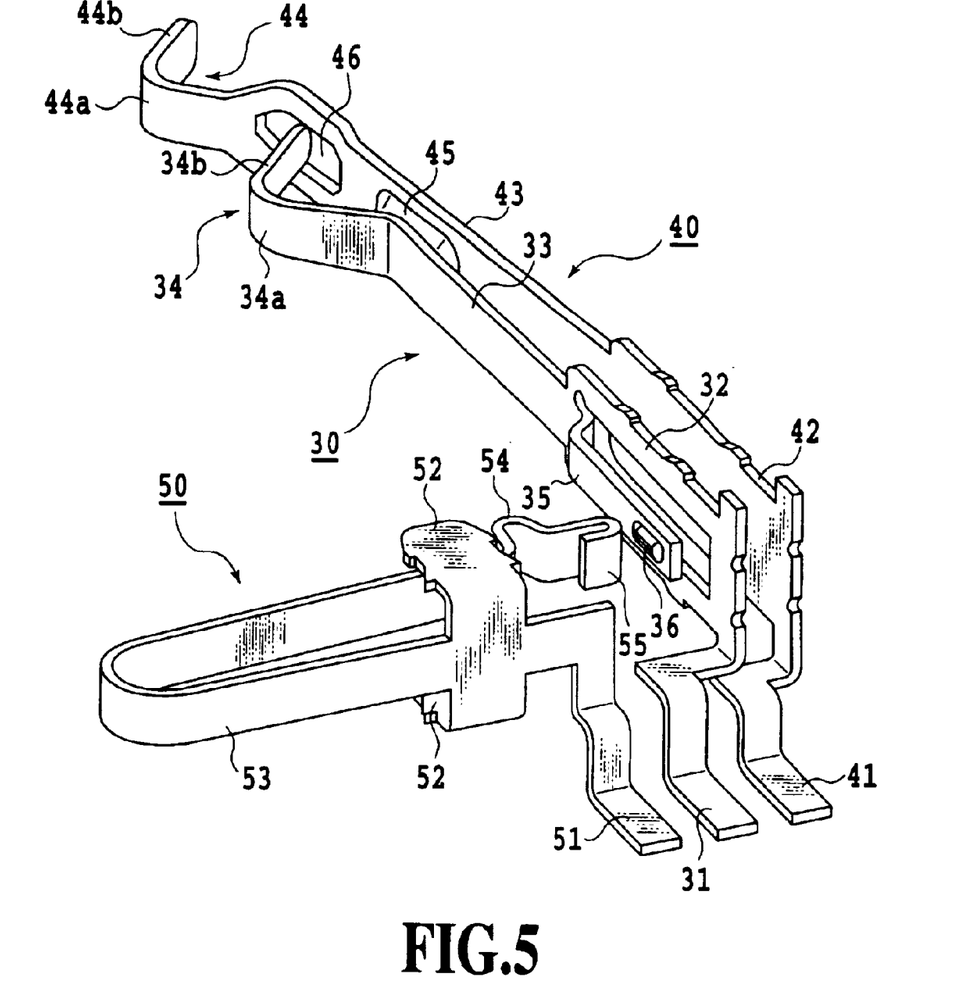
FIG. 5 is a perspective view showing an embodiment of a switch structure of the card connector according to the invention.

FIG. 5 shows a detailed construction of the write protect detection switch SW1 and the card recognition switch SW2.

The contact leaf spring 30 is made from a metal piece having a terminal portion 31 connected to the contact pad of the printed circuit board; a fixed portion 32 securely press-fitted in the housing body 11; a spring portion 33 extending along the card side surface; a front end engagement portion 34 protruding in an arc; and a spring portion 35 extending from the fixed portion 32 in a direction opposite that of the spring portion 33. With the fixed portion 32 securely held, the contact leaf spring 30 is supported like a cantilever beam. The spring portion 35 is formed with a contact projection 36. The front end engagement portion 34 has an engagement portion 34a which, as shown in FIG. 3 and FIG. 4, engages the front side portion 2a of the recess 2 formed in the card 1 or the write protect button 3 slid to the front side portion 2a when the card 1 is inserted. The front end engagement portion 34 also has a front end extension portion 34b extending toward the front from the engagement portion 34a. The spring portion 33 of the contact leaf spring 30 is urged so that when the card 1 is inserted, the engagement portion 34a of the contact leaf spring 30 can press against the bottom surface of the front side portion 2a of the recess 2 of the card 1.

Similarly, the contact leaf spring 40 is made from a metal piece having a terminal portion 41, a fixed portion 42, a spring portion 43 and a front end engagement portion 44 protruding in an arc. In the middle of the spring portion 43 a contact projection 45 is formed which comes into contact with the contact leaf spring 30. The contact projection 45 protrudes on the contact leaf spring 30 side. The front end engagement portion 44 has an engagement portion 44a which, when the card 1 is inserted, engages the rear side portion 2b of the recess 2 formed in the card 1 or the write protect button 3 slid to the rear side portion 2b, and a front end extension portion 44b extending toward the front from the engagement portion 44a. The spring portion 43 of the contact leaf spring 40 is urged so that when the card 1 is inserted, the engagement portion 44a of the contact leaf spring 40 can press against the bottom surface of the rear side portion 2b of the recess 2 of the card 1.

To avoid contact between the front end extension portions 34b and 44b of the contact leaf springs 30 and 40, the contact leaf spring 40 is formed with an opening 46. The front end extension portions 34b and 44b have at least certain lengths to prevent the engagement portions 34a and 44a from catching on the recess 2 of the card 1 when the card 1 is inserted and from causing the contact leaf springs 30, 40 to bend.

The contact leaf spring 50 is made from a metal piece having a terminal portion 51 connected to the contact pad of the printed circuit board, a grip portion 52 for holding the top and bottom surfaces of the housing body 11 to fix the contact leaf spring 50, a folded spring portion 53, an engagement portion 54 projected to engage the front end face of the inserted card 1, and a contact portion 55 at the free end of the engagement portion 54 to come into contact with the contact projection 36 of the contact leaf spring 30.

In this switch structure, the terminal portion 31 of the contact leaf spring 30 as a common leaf spring of SW1 and SW2 is connected to the ground of the printed circuit board. The terminal portions 41, 51 of the other contact leaf springs 40, 50 are applied with appropriate voltages.

In such a switch structure, when the card 1 is not inserted, the contact portions of the contact leaf spring 50 and the contact leaf spring 30 are parted as shown in FIG. 3, so that the card recognition switch SW2 made up of the contact leaf springs 30 and 50 is in the off state. Further, when the card 1 is not inserted, the contact leaf spring 30 and the contact leaf spring 40 are parted at their contact portions as shown in FIG. 3, so that the write protect detection switch SW1 made up of these contact leaf springs 30, 40 is in the off state.

Figure 6:
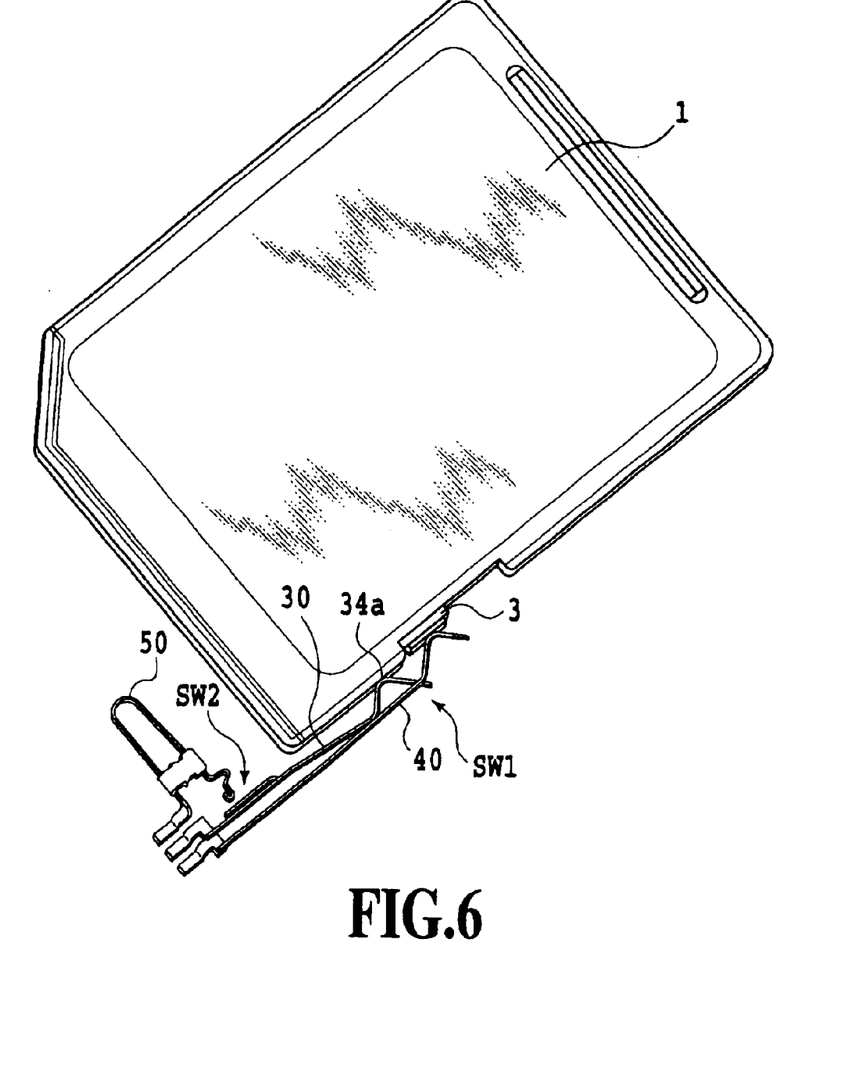
FIG. 6 is a perspective view showing the embodiment of the switch structure of the card connector according to the invention when the card with the write protect button set to the write disable position is inserted halfway.
Figure 8:
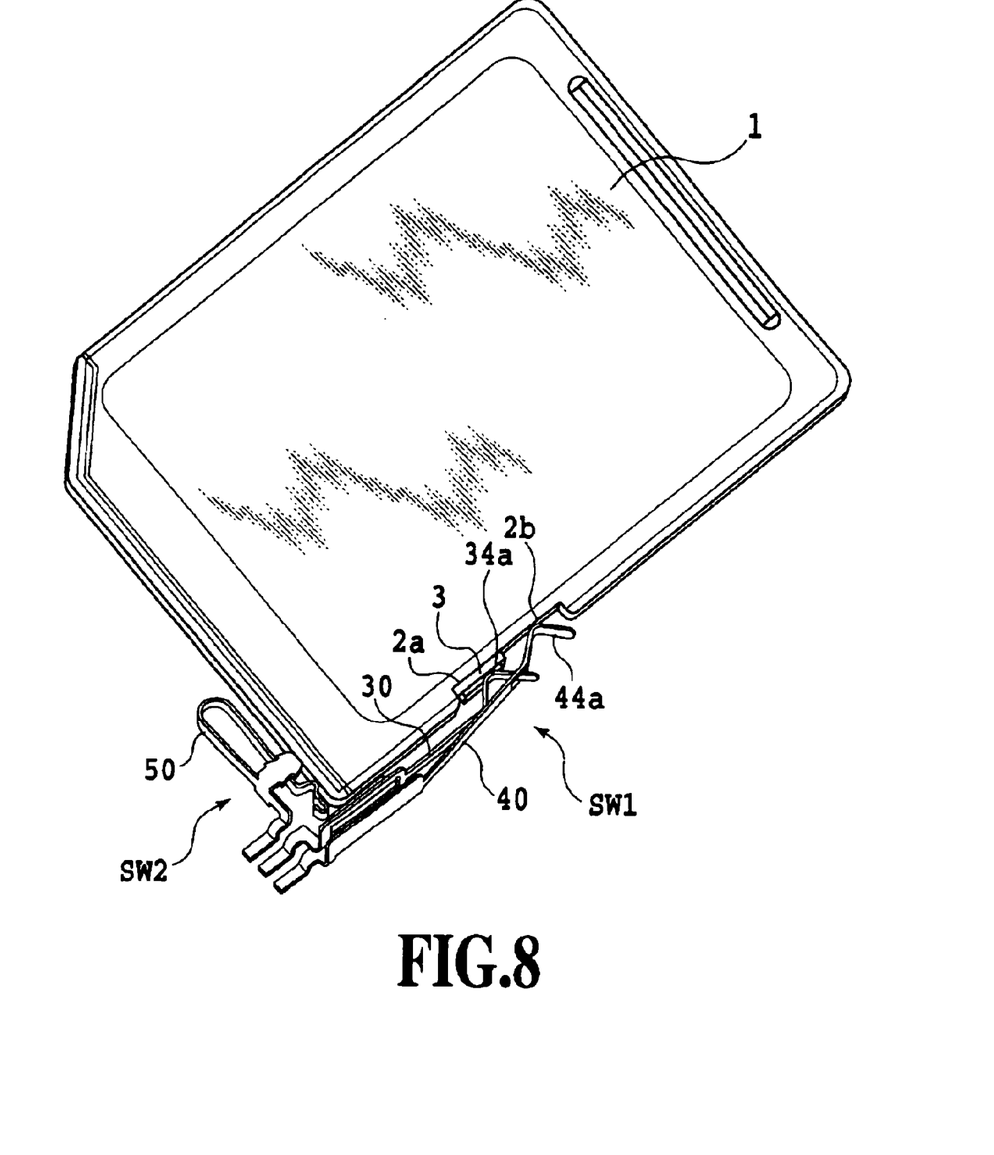
FIG. 8 is a perspective view showing the embodiment of the switch structure of the card connector according to the invention when the card with the write protect button set to the write disable position is fully inserted.

Next, by referring to FIGS. 4, 6 and 8, we will describe the operations of the switches SW1, SW2 when the card 1 with the write protect button 3 set at the write-disable position is inserted.

FIG. 6 shows the states of the switches SW1, SW2 when the card 1 is inserted halfway into the connector 10. In the state shown in FIG. 6, the engagement portion 34a of the contact leaf spring 30 is pushed by the card side surface to deflect the contact leaf spring 30 toward the contact leaf spring 40 to turn on the write protect detection switch SW1 made up of the contact leaf springs 30, 40. In this state, because the front end face of the card 1 is not yet in contact with the engagement portion 54 of the contact leaf spring 50, the contact leaf spring 50 is not elastically displaced. Hence, the contact portion 55 of the contact leaf spring 50 is spaced from the contact projection 36 of the contact leaf spring 30, leaving the card recognition switch SW2 turned off.

When the card 1 is fully inserted into the connector, the switches SW1, SW2 assume the states of FIG. 4 and FIG. 8.

In the states shown in FIG. 4 and FIG. 8, the engagement portion 54 of the contact leaf spring 50 is pushed by the front end face of the card 1 to elastically displace the spring portion 53 of the contact leaf spring 50, moving the contact portion 55 of the contact leaf spring 50 toward the contact leaf spring 30. As a result, the contact portion 55 of the contact leaf spring 50 engages the contact projection 36 of the contact leaf spring 30, turning on the card recognition switch SW2.

At the same time, the engagement portion 34a of the contact leaf spring 30 engages the button 3 situated at the front side portion 2a of the recess 2 of the card 1 and the engagement portion 44a of the contact leaf spring 40 engages the bottom surface of the rear side portion 2b of the recess 2. At this time, the contact leaf springs 30, 40 contact each other through the contact projection 45, turning on the write protect detection switch SW1.

Figure 7:
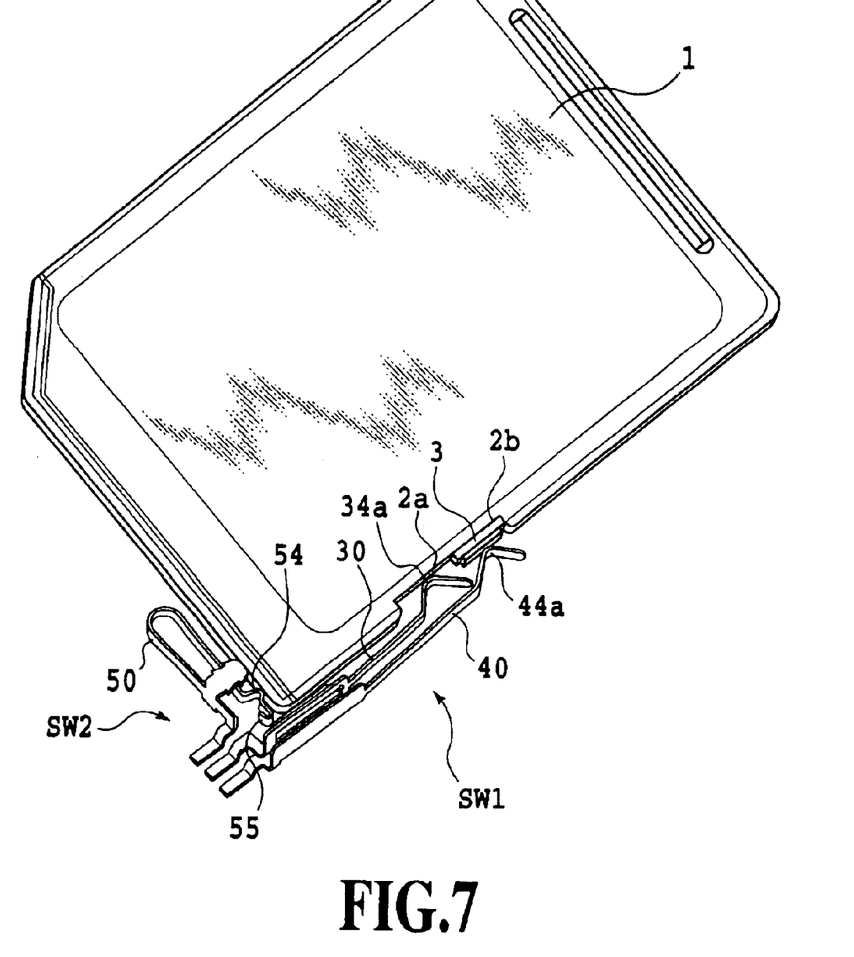
FIG. 7 is a perspective view showing the embodiment of the switch structure of the card connector according to the invention when the card with the write protect button set to the write enable position is fully inserted.

Next, FIG. 7 shows the states of the switches SW1, SW2 when the card 1 with the write protect button 3 set at the write-enable position is fully inserted.

In the state of FIG. 7, too, the engagement portion 54 of the contact leaf spring 50 is pushed by the front end face of the card 1 to elastically displace the spring portion 53 of the contact leaf spring 50, moving its contact portion 55 toward the contact projection 36 of the contact leaf spring 30, bringing it into contact with the contact projection 36 and turning on the card recognition switch SW2.

The engagement portion 34a of the contact leaf spring 30 engages the bottom surface of the front side portion 2a of the recess 2 of the card 1 and the engagement portion 44a engages the write protect button 3 of the card 1. At this time the contact leaf springs 30, 40 are separated from each other at all portions, leaving the write protect detection switch SW1 turned off.

In the write protect detection switch SW1, the contact leaf springs 30, 40 are brought into or out of contact with each other according to the position of the write protect button 3 and their engagement or disengagement is electrically detected by an electric circuit connected to the terminal portions 31, 41 of the contact leaf springs 30, 40 to determine at which position, the write disable or write enable position, the write protect button 3 of the IC card 1 is situated.

In the construction of this switch SW1, whichever of the two slide positions the write protect button 3 may be situated at, the engagement portion of one contact leaf spring engages the write protect button 3 and the engagement portion of the other contact leaf spring engages the recess 2 adjoining the write protect button. Hence, even considering a play due to the difference in width between the card accommodation portion of the connector 10 and the width of the card 1 or parts and assembly tolerances, the movement of the write protect button 3 between the two positions results at all times in the contact leaf springs 30, 40 being displaced by a distance equal to the height of the write protect button 3.

Further, in the construction of this switch SW1, because the contact leaf springs 30, 40 are brought into or out of contact with each other by utilizing the write protect button 3 and the recess 2 adjacent to the button, the directions of displacements of the contact leaf springs 30, 40 are opposite. For example, when the contact leaf springs 30, 40 shift their states from FIG. 7 where the contact leaf springs 30, 40 are separated to FIG. 8 where they are engaged, the contact leaf springs 30, 40 are displaced toward each other until they contact each other. The shift of their states from FIG. 8 to FIG. 7 is realized by reversing their displacements, i.e., by the contact leaf springs 30, 40 being displaced away from each other and separated.

In the construction of this switch SW1, because the contact leaf springs 30, 40 can be brought into or out of contact with each other by their relative displacement equal to two times the height of the write protect button 3, this switch structure can effectively be applied to small cards that cannot provide the write protect button 3 with a sufficient height.

In the card recognition switch SW2 made up of the two contact leaf springs 30, 50, the contact leaf springs 30, 50 are brought into or out of contact with each other according to whether the card 1 is loaded or not. So, by electrically detecting their engagement or disengagement by using an electric circuit connected to the terminal portions 31, 51 of the contact leaf springs 30, 50, it is possible to determine whether the card 1 is completely inserted into the connector 10.

Figure 9:
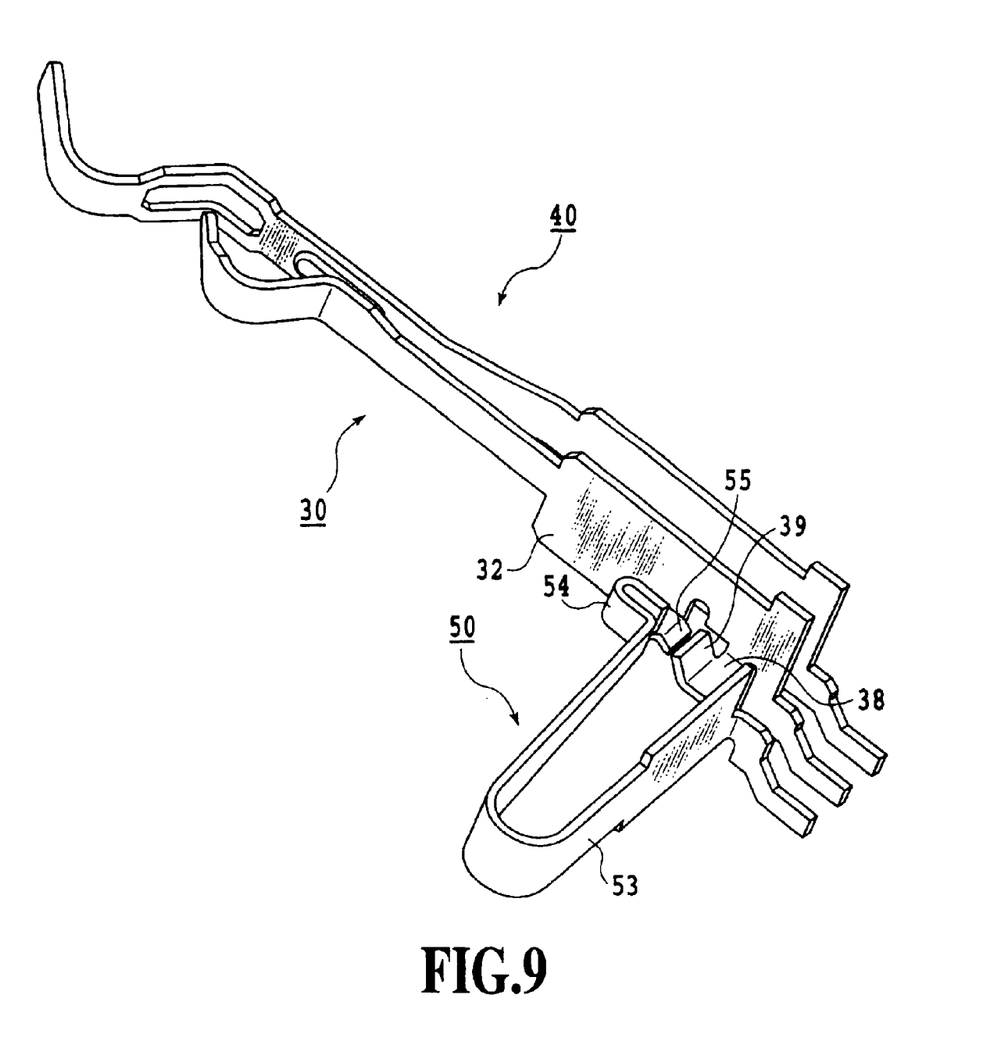
FIG. 9 is a perspective view showing another embodiment of the switch structure of the card connector according to the invention.

FIG. 9 shows another embodiment of the invention.

In the embodiment of FIG. 9, a projection 38 protrudes from the fixed portion 32 of the contact leaf spring 30 at right angles toward the contact leaf spring 50, and a contact 39 is formed at an edge of the projection 38.

The contact leaf spring 50 has an engagement portion 54 at the front end of the folded spring portion 53 which engages the front end face of the inserted card 1. At the free end of the engagement portion 54 there is formed a contact portion 55 that engages the contact 39 of the contact leaf spring 30.

The switch structure of FIG. 9 mainly utilizes the elastic displacement of the contact portion 55 of the contact leaf spring 50 in the card insertion/retraction direction to bring the contact portion 55 into or out of engagement with the contact 39 of the contact leaf spring 30.

Because in this embodiment the write protect detection switch SW1 and the card recognition switch SW2 are formed by sharing the contact leaf spring 30 as described above, the number of parts of the contact leaf springs can be reduced, leading to reductions in cost and space.

Further, in this embodiment, the write protect detection switch SW1 is arranged on the side wall of the connector housing and the card recognition switch SW2 is arranged inside the card abutment wall of the connector housing, so that SW1 and SW2 are located collectively at one front corner of the card 1. This arrangement allows the two switches to be installed efficiently in a small space, contributing to a reduction in the size of the connector structure.

Although in the above embodiment the contact leaf spring 50 is of a folded type, a leaf spring of the same type as other contact leaf springs 30, 40 may be used.

In the above embodiment we have described the button position indicated by a solid line in FIG. 1 to be the write enable position and the button position indicated by a dashed line to be the write disable position, it is possible to match the button position indicated by a solid line in FIG. 1 to the write disable position and the button position indicated by a dashed line to the write enable position.

Further, while the above embodiment forms the opening 46 in the contact leaf spring 40 to prevent the front ends of the contact leaf springs 30, 40 from contacting each other, the contact leaf springs 30, 40 may be prevented from contacting at their ends by using other methods, such as by bending one of the front ends of the leaf springs in a direction that avoids that contact.

Further, while the above embodiment uses an SD card as the IC card 1, this invention can be applied to any card having a slide type write protect button.

The connector housing applying the present invention may employ any other shape and material.

INDUSTRIAL APPLICABILITY

With this invention, two switches can be arranged efficiently in a small space, reducing the size of the connector structure. This invention can reduce the number of parts of the contact leaf springs and therefore the cost and space.

What is claimed is:

1. A switch structure of a card connector, wherein the card connector is configured to hold a card in a connector housing in such a manner that contact pads of the card engage contact terminals arranged in the connector housing, the card having a write-protect button slidable in a recess formed in a card side surface, the switch structure comprising;

a first switch arranged on a side wall portion of the connector housing, wherein the switch is configured to maintain contact with the write-protect button when the card is inserted, regardless of a slide position of the button; and a second switch arranged in a card abutment wait of the connector housing configured to detect the presence or absence of the card, and wherein the first switch comprises a pair of contact leaf springs, the movement of which effects the state of said first switch, and wherein said leaf springs are configured so that at least one of the contact leaf springs contacts the write protect button when the card is inserted regardless of a slide position of the write protect button.

2. A switch structure of a card connector comprising:

means for maintaining contact with a write-protect button of a card to be inserted, regardless of a slide position of the button; and means for detecting the presence or absence of the card to be inserted, and wherein the means for maintaining contact comprises a pair of contact leaf springs, the movement of which effects the state of said first switch, and wherein said leaf springs are configured so that at least one of the contact leaf springs contacts the write-protect button when the card is inserted regardless of a slide position of the write-protect button.

* * * * *

UNITED STATES PATENT AND TRADEMARK OFFICE
CERTIFICATE OF CORRECTION

PATENT NO. : 6,848,923 B2
DATED : February 1, 2005
INVENTOR(S) : Toshihumi Takada et al.

It is certified that error appears in the above-identified patent and that said Letters Patent is hereby corrected as shown below:

Title page,
Item [75], Inventors, "Tokyo" should read -- Hokkaido --.

Column 8,
Line 35, "wait" should read -- wall --.

Signed and Sealed this

Seventh Day of June, 2005

JON W. DUDAS
*Director of the United States Patent and Trademark Office*